Sept. 1, 1970 W. H. ROBINSON 3,526,905
CLOSING MEANS AND METHOD
Filed Nov. 25, 1968 5 Sheets-Sheet 1

INVENTOR.
WILLIAM H. ROBINSON
BY
ATTORNEY

Sept. 1, 1970  W. H. ROBINSON  3,526,905
CLOSING MEANS AND METHOD
Filed Nov. 25, 1968  5 Sheets-Sheet 2
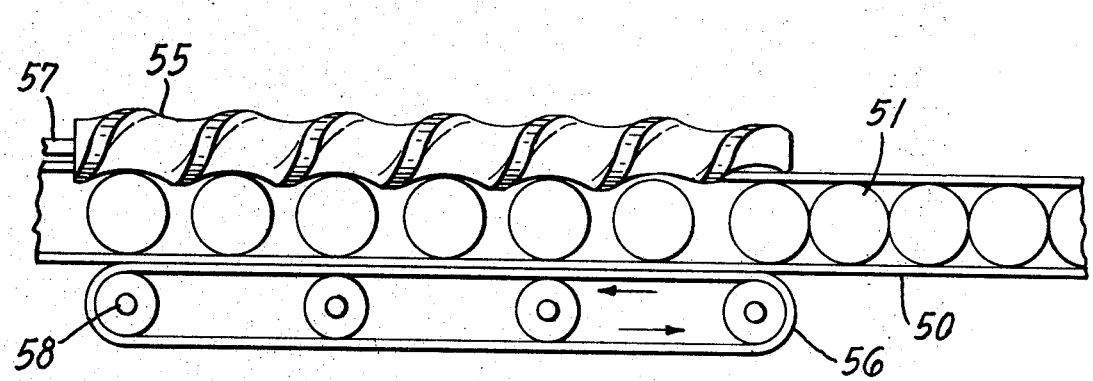
Fig. 4
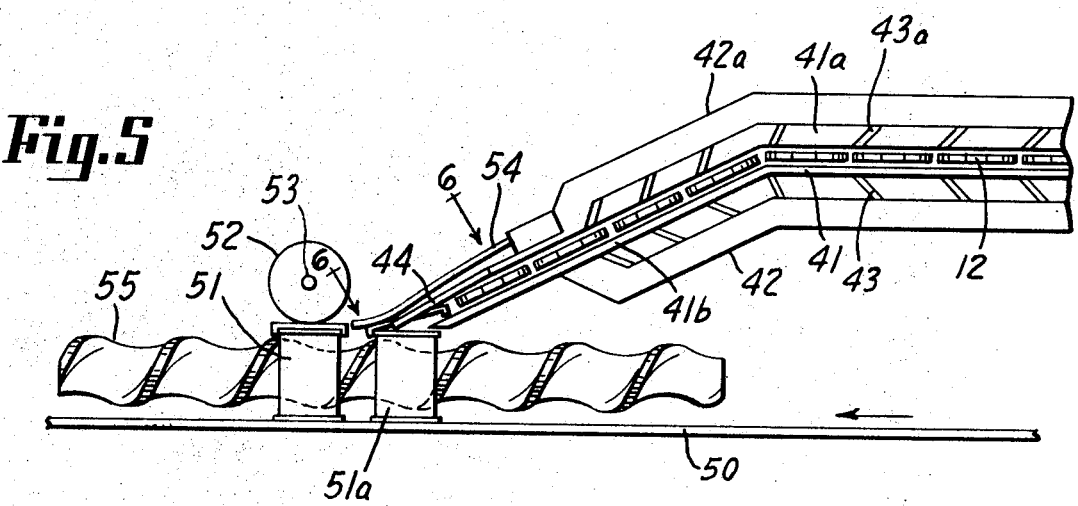
Fig. 5
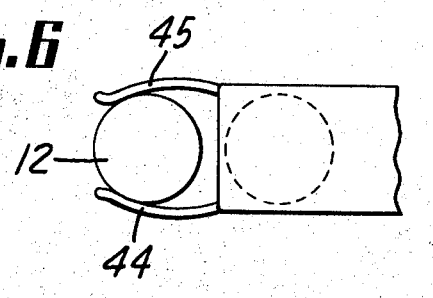
Fig. 6
INVENTOR.
WILLIAM H. ROBINSON
BY
ATTORNEY Sept. 1, 1970     W. H. ROBINSON     3,526,905
CLOSING MEANS AND METHOD
Filed Nov. 25, 1968     5 Sheets—Sheet 5
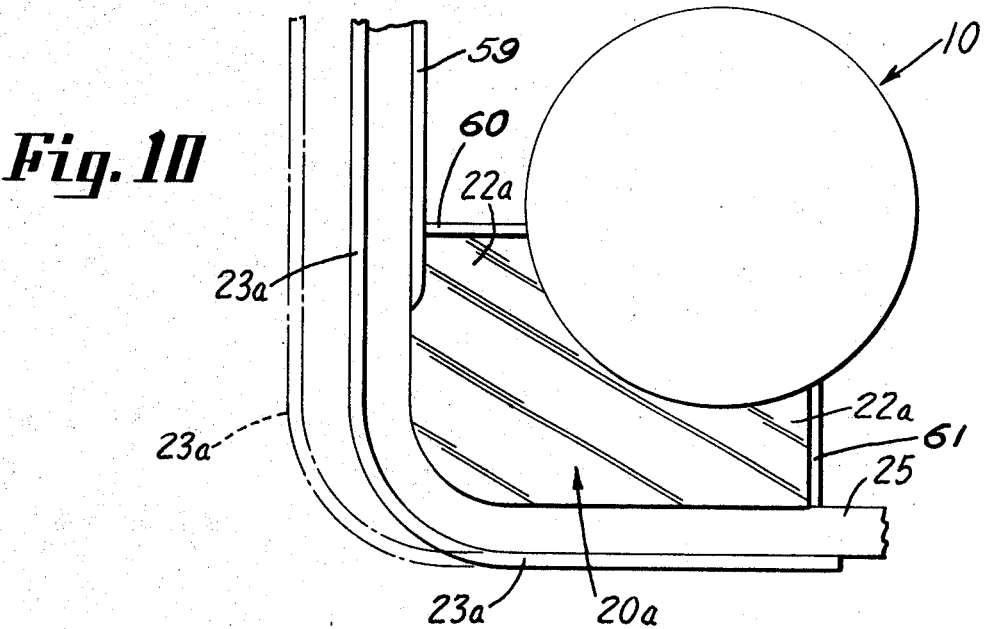
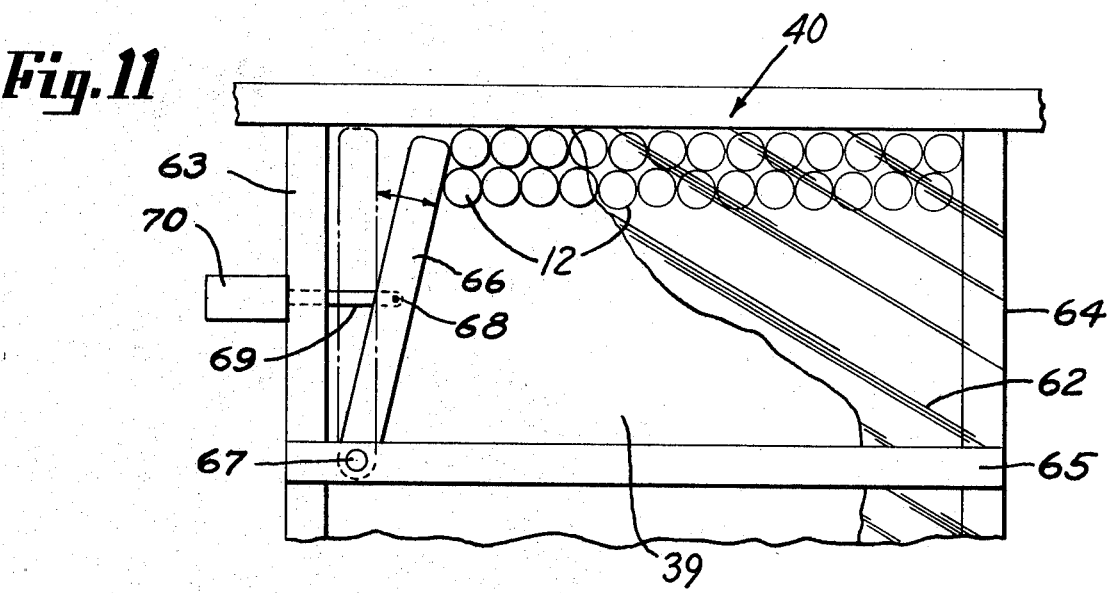
INVENTOR.
WILLIAM H. ROBINSON
BY
ATTORNEY

United States Patent Office 3,526,905
Patented Sept. 1, 1970

3,526,905
CLOSING MEANS AND METHOD
William H. Robinson, New Vienna, Ohio 45159
Continuation-in-part of application Ser. No. 483,252,
Aug. 27, 1965. This application Nov. 25, 1968, Ser.
No. 778,441
Int. Cl. B65g 47/24
U.S. Cl. 198—33
8 Claims

ABSTRACT OF THE DISCLOSURE

Articles which are dished or cup-like and forming an open side, for example flexible closure caps and the like, are unscrambled from a haphazard mass thereof and are positioned into a layer in which the open side of the respective closures may face in opposite directions. Articles are removed from the layer and are fed between moving surfaces which advance the articles individually and positively to a desired oriented position. Upon removal from the moving surfaces, the oriented articles are arranged in a moving layer from which they are thereafter separated and fed into registery with other articles for assembly therewith as in a container capping operation.

---

This application is a continuation-in-part of United States application Ser. No. 483,252 filed Aug. 27, 1965, now abandoned.

BACKGROUND

This invention relates generally to method and apparatus for capping containers and the like and, more particularly, to the methods and simple reliable apparatus operable at high speeds for unscrambling a haphazard mass of articles which are dished or recessed and forming an open side, such as closure caps, and positively orienting said articles and delivering same in a desired position and in a layer upon a conveyor for delivery to a work station for assembly with the other articles.

Prior attempts to speedily unscramble, feed and orient to a desired position flexible closure elements have been unsuccessful in obtaining the reliability required by commercial operations. The problems connected with such operations are aggravated where relatively flexible, particularly plastic, closure elements are employed. In sorting and aligning flexible plastic closure elements from a scrambled, haphazardly disposed mass of such elements, the elements have a tendency to distort and/or cling together, thereby making it exceedingly difficult to separate and orient the individual closure members in a desired position. Accordingly, a principal object of the present invention is to provide improved methods and means to expeditiously unscramble, and positively and reliably orient plastic flexible closures to a desired oriented position at rates of speed heretofore believed unattainable.

SUMMARY

In operations in accord with the present invention, it is now possible, irrespective of varied distortions, inherent flexibility together with lack of resilience to rapidly unscramble from a haphazard mass of articles such as flexible plastic closures, and arrange such individual articles in layer. Such articles are thereafter removed from the layer and are fed between moving surfaces which advance the articles individually and positively to a desired position. Two spaced apart locations at the dished side of each article are preferably maintained in frictionally driven engagement with one of the moving surfaces while said articles are concomitantly turned thereby through a path defined by said moving surface from the initial position to the desired oriented position, in which position the open side of all said articles faces in the same direction. The oriented articles are then removed from the moving surfaces and are arranged in a moving oriented layer from which the oriented articles are thereafter removed and fed into registry with other articles for assembly therewith as in a capping apparatus, all such operations being performed at speeds heretofore believed unattainable.

DESCRIPTION

The foregoing, as well as additional objects and advantages of the invention, will become apparent from the following disclosure taken in conjunction with the accompanying drawings in which:

FIG. 4 is a plan view illustraing how containers are spaced and moved through the capping portion of the apparatus of FIG. 1;

FIG. 5 is an elevational view, similar to FIG. 4, illustrating how containers are brought into registry with individual closures and the subsequent securing of the closure to a container;

FIG. 6 is a partial view, looking in the directions of arrows 6—6 of FIG. 5;

FIG. 10 is a fragmentary sectional view, looking in the direction of arrows 10—10 in FIG. 3, illustrating a modification of the embodiment of FIG. 1; and, FIG. 11 is a fragmentary top plan view illustrating a further modification of the embodiment of FIG. 1.

Figure 1:
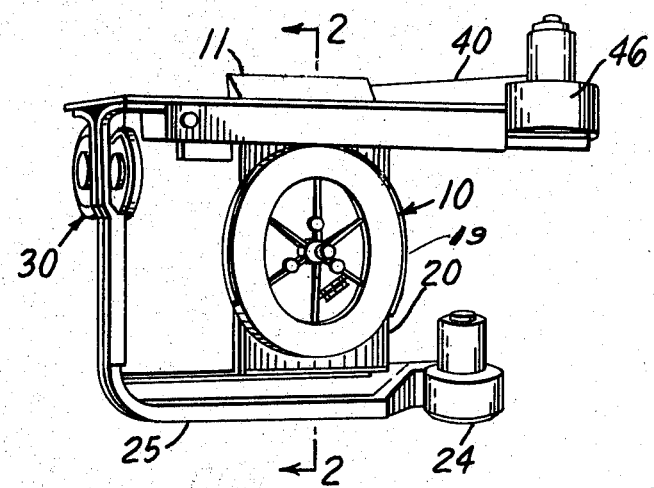
FIG. 1 is a perspective view illustrating the general arrangement of apparatus embodying the present invention.

Heretofore, in certain closure cap orienting apparatus, complex and additional apparatus requirements were necessary in order to attempt high speed handling of the caps during capping operations. Such apparatus, in addition to recognized deterrents of uncontrolled gravity feeding, includes the provision of a conveyor equipped with permanent magnets for removing alleged oriented caps so that the caps may be advanced to capping equipment from a potential undesirable, commingling and piling-up of the caps prior to the neecssary advancement of single caps in a line from a single opening to a capping operation. Additionally, such closure cap orienting devices require additional mechanisms to control the flow of caps to orienting rolls atempting to preclude possible jamming of the entire mechanism. In contradistinction, applicant has provided a high speed orienting apparatus which embodies positive control and advancement of individual closure caps and patricularly relatively light-in-weight, flexible and distorted caps for a subsequent capping operation without the necessity of using any type of magnet arrangement or without the necessity of a special device for stopping the flow of caps to the orienting mechanism.

Particularly in high speed, mass production operations where large quantities of flexible plastic closures are required, it is desirable to maintain a supply or mass of such parts in a hopper of suitable size so that the parts are easily fed as required through an opening in the unscrambling device. However, such operations are exceedingly complex because of the high coefficient of friction between such plastic closures, the warpage characteristics of the closures per se, the tendency of the closures to nest together, etc. Accordingly, such closures tend to stick together and resist advancement through guide passageways for feeding and orienting procedures required preliminary to capping the closures on containers. And these problems are intensified when loading such closures into the hopper where they become completely disoriented and scrambled.

Referring to the drawings, a rotatable unscrambling device 10 receives articles 12, such as closures for containers, from a hopper 11. Rotation of device 10 tumbles and imparts a rotary movement to the mass of articles 12 as they pass through the device which arranges individual articles 12 in an edge-to-edge layer relationship of such articles which are subsequently discharged into a collector manifold 20. The thus disposed articles 12 are removed from manifold 20 and are fed successively through a device which selectively turns individual articles 12 in one direction or another and delivers all such articles onto a conveyor in a second layer in which all such articles are expeditiously disposed in accord with this invention with a desired uniform orientation for delivery to a work station for utilization in subsequent operations.

As shown, articles 12 are closure members that have a cup-like cross-sectional shape with a skirt portion depending from one side of a central portion at the peripheral edge thereof. In the description, reference is made to flexible closure members of plastic material since such members present very difficult problems heretofore unsolved, particularly under high speed commercial operations.

Figure 2:
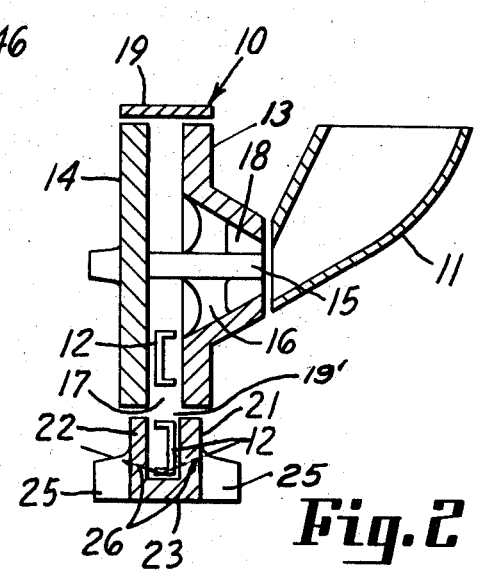
FIG. 2 is a view, looking in the direction of arrows 2—2 of FIG. 1, and showing in cross-section the hopper feed, alignment means, and feeding means of the apparatus of FIG. 1.

In FIGS. 1 and 2, the unscrambling device is indicated generally at 10 and includes a stationary hopper 11 for receiving a mass of commingled articles 12, such as flexible plastic closures. Such a mass contains a plurality of such articles which are scrambled and haphazardly arranged as they are fed from hopper 11 into a rotatable structure which includes a central annular axially-disposed passageway communicating with a radially-disposed passageway as shown in FIG. 2. Said rotatable structure includes spaced apart plates 13, 14 connected to a shaft and arms 16 for simultaneous rotation with said plates. Rotation of plates 13, 14 and shaft 15 is effected by any suitable and convenient means such as a motor, not shown.

Also as shown in FIG. 2, the surfaces of plate 13 are designed to centrally incorporate a structure which may be cone-shaped and is designed for receiving the mass of closures from hopper 11. Accordingly, the central portions of plate 13 slope inwardly toward shaft 15 to provide a hollow portion or passageway 18 in communication with the interior of hopper 11.

The spacing between the outer portions of plate 13 and plate 14 should be sufficient to provide passageway 17 with a width which is enough to receive flexible closures 12 disposed as best shown in FIG. 2 and to permit such closures to move freely through passageway 17 but should not be so wide as to permit overlapping and jamming of such closures, some of which may be warped, within passageway 17.

During operations, the mass of closures 12 are received from hopper 11, sequentially pass into passageway 18 and are rotated and tumbled therein prior to their passing into rotating passageway 17 from which they are discharged in a layer, as hereinafter described. An enclosure or casing member 19 is closely spaced adjacent the outer extremeties of plates 13, 14 substantially throughout the entire circumference thereof to confine the closures within rotating passageway 17 until they are ready for discharge therefrom.

The closures are received from passageway 17 into an elongate collector manifold 20 having a substantially U-shaped cross section as best shown in FIG. 2. Thus, the centrifugal force of the closures resulting from rotation of passageway 17 causes such closures to be discharged from passageway 17 through an elongate opening provided in member 19. Preferably such opening is coextensive with manifold 20 and is in registry therewith and with rotating passageway 17. Manifold 20 comprises a pair of upstanding side members 21, 22 and a bottom member 23. As shown in FIGS. 1 and 2, manifold 20 is coextensive with a substantial segment of rotating passageway 17 so that closures discharged into manifold 20 are arranged in a layer although the open sides of certain closures may face in opposite directions.

As best shown in FIG. 2, in the layer of closures 12 thus formed in manifold 20, the respective closures are in edge-to-edge relation and certain closures form a bottom row of such closures between manifold walls 21, 22 and are supported by member 23 with other such closures stacked on top of said bottom row. The closures comprising said bottom row are then removed from manifold 20 and fed to an orienting device 30, thereby clearing the way for the upper stacked closures to form a new bottom row.

Figure 3:
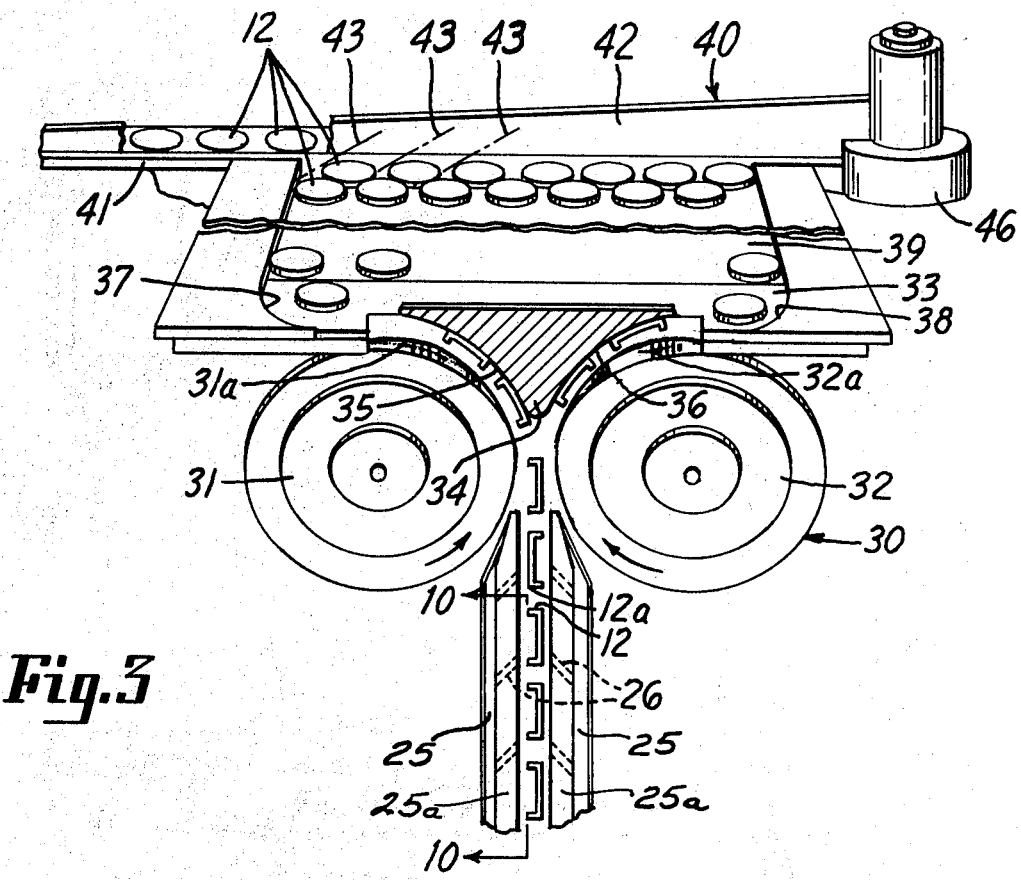
FIG. 3 is a perspective view, partly broken away, showing orienting means for moving individual articles to a desired oriented position.

Such removal and feeding of the closures is achieved by subjecting the individual closures to a series of air streams for controlling and advancing said closures from manifold 20 to orienter device 30. As best shown in FIGS. 2 and 3, air is supplied by a fan 24 through a pair of passageways or air ducts 25 between which closures 12 are fed. A plurality of vanes, air scoops or nozzles 26 are provided at spaced intervals along adjacent walls 25a. As indicated in FIG. 2, certain of the nozzles 26 extend through the lower portion of upstanding walls 21, 22 of manifold 20. Opposing streams of air are thus directed by nozzles 26 against opposite sides of closures 12 thus essentially balancing the opposing lateral forces on each closure. Additionally, nozzles 26 direct such opposing streams of air in the desired direction of feeding and also in a substantially downward direction. Thus, closures 12 are carried in an air stream which stream also cushions the closures on both sides thereof and thereby facilitates unimpeded advancement of the closures to the orienting device 30.

Since the open side of individual closures 12 leaving manifold 20 may face in opposite directions, they are arranged, prior to the capping operation, so that the open sides of all closures are facing in the same direction. And in accordance with the present invention, this is accomplished by passing the closures through an orienter device 30 which individually turns each closures to a desired oriented position in which their open sides all face in the desired direction.

Device 30 comprises a pair of contra rotating rolls 31, 32 having peripheral surfaces 31a, 32a that are spaced apart and form a nip therebetween through which the closures pass upwardly to be oriented as is best shown in FIG. 3.

Figure 7:
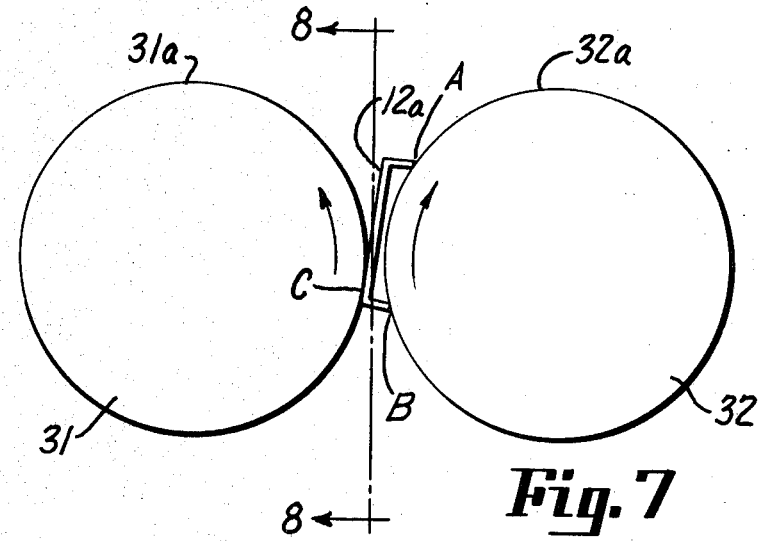
FIG. 7 is an end view, looking generally in the same direction as in FIG. 3, illustraing a closure passing through the orienting means.

The spacing between the peripheral surfaces of rolls 31, 32 is slightly less than the overall thickness of closures 12 so that each such closure is squeezed somewhat as it passes through the nip between the rolls. As is best shown in FIG. 7, the squeezing action of the rolls applies pressure to the individual closures simultaneously at three points A, B, C such that edge portions of the dished side of closures 12 engage and are frictionally driven by the peripheral surface 32a of roll 32 as at A and B. By maintaining simultaneously engagement at A and B, the closure 12a is caused to follow the peripheral surface 32a while and after the leading portion of closure 12a passes through and beyond the nip. In a similar manner, an article 12 having its dished side oppositely disposed to that of closure 12a (FIG. 7) is caused to follow the peripheral surface 31a.

Preferably, the spacing between the peripheral surfaces 31a, 32a is made adjustable to accommodate different kinds and different sizes of closures 12. The amount of pressure exerted by the rolls on the closures should be sufficient to establish and maintain pressure at the three locations A, B, C and such pressure should be sufficient to result in the closure frictionally simultaneously gripping the peripheral surface of the roll at discrete locations A, B and being positively driven by said roll surface. However, the pressure should not be so great as to damage a closure or to deform a flexible closure to such an extent that contact is lost at one of the locations A or B. Thus, in accordance with the invention, closures 12 are caused to follow a path defined by one of the peripheral surfaces of rolls 31, 32.

Additionally, provision is made for maintaining said simultaneous engagement at said two discrete locations A and B after the closure 12 has passed completely through the nip so that the closure will continue to be turned through a path defined by one of said roll surfaces until the closure has been rotated and advanced by said roll surfaces to a desired position with the open side of the closure facing the desired direction. This is accomplished by provision of a plate member 34 generally triangular in shape and having curved surfaces 35, 36 conforming to the curvature of the peripheral surfaces of rolls 31, 32 but spaced therefrom, as shown in FIG. 3. The spacing between curved surfaces 35, 36 and peripheral surfaces 31a, 32a is governed by the same considerations as those governing the spacing at the nip between peripheral surfaces 31a, 32a. Preferably, the width of surfaces 35, 36 is made as narrow as possible to minimize frictional forces which may tend to impede advancement of the moving closures but at the same time insuring that said frictional driving engagement is maintained simultaneously between said discrete locations A and B with the corresponding peripheral roll surface.

Articles 12 are then discharged from the surfaces of rolls 31, 32 unto a table portion 33. Table portion 33 is relatively narrow and is provided with rounded corner portions 37, 38. Accordingly, when a closure member is discharged either by roll 31 or 32, it has sufficient momentum so that it slides across the upper surface of table portion 33 and around corner portion 37 or 38 onto a moving endless belt 39. When closures 12 are thus discharged onto belt 39 they are then all positioned with their open side facing downwardly and are carried by belt 39 in a direction generally toward another feeding means shown generally at 40. As shown in FIGS. 3 and 11, the movement of belt 39 arranges closures 12 in a layer extending across the width of belt 39.

Figure 8:
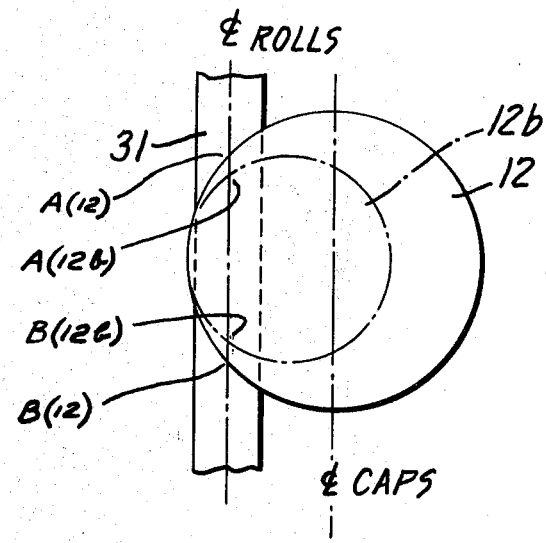
FIG. 8 is a view, looking in the direction of arrows 8—8 of FIG. 7, illustrating a preferred disposition of closure elements relative to the orienting means.
Figure 9:
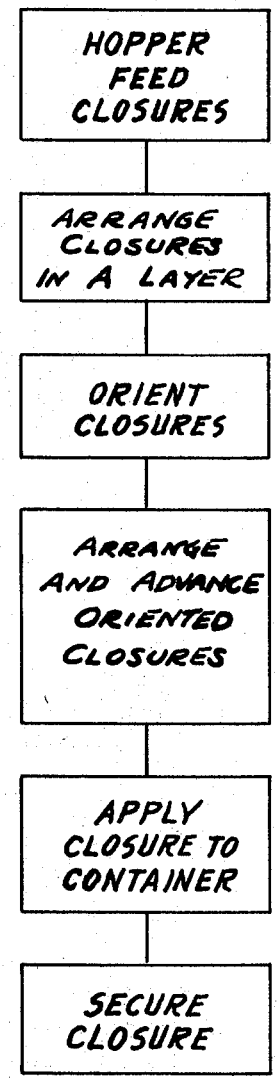
FIG. 9 is a diagrammatic illustration of the method according ot the present invention.

As noted heretofore, it is important that the engagement between the peripheral surface of one of the orienter rolls be maintained with the two discrete locations A, B, simultaneously while the closures 12 pass between the rolls and until they are discharged onto table portion 33. In orienting plastic closures which are quite flexible and often deformed, especially in larger sizes, the problem of maintaining such simultaneous engagement is very difficult. However, in accordance with the invention, such simultaneous engagement is readily established and maintained by feeding closures 12 between the rolls 31, 32 with one edge of the closures adjacent one face of said rolls, as indicated by points A(12) and B(12) for closure 12 and by points A(12b) and B(12b) for closure 12b in FIG. 8. This provides the additional advantage of added flexibility in that closures 12 of differing sizes can be handled without requiring complicated adjustment or modifications of the apparatus.

Belt 39 carries the now oriented closures 12 to another feeding means 40 which includes upper and lower members 41, 41a between which the closures are received after being discharged from belt 39 (FIGS. 3, 5 and 11).

Above and below members 41, 41a are disposed ducts or conduits 42, 42a having disposed therein at spaced intervals throughout the length thereof a plurality of nozzles indicated by broken lines 43, 43a. Air is supplied by a fan 46 through ducts or conduits 42, 42a and is ultimately discharged by nozzles 43, 43a against opposite sides of closures 12 thereby propelling a succession of closures between members 41, 41a in a manner similar to that described between ducts 25. The thus propelled oriented closures travel between members 41, 41a to a work station for assembly with a plurality of other articles such as containers 51.

As shown in FIG. 11, side members 63, 64 support a cover 62 which extends over table portion 33 and the now oriented closures being advanced by moving belt 39 to prevent upsetting or other disarrangement of such closures. A cross member 65 pivotally supports a member 66 for limited oscillatory movement relative to point 67 between cover 62 and moving belt 39. A device 70 includes a motor and a member 69 connected at pivot 68 to member 66 for imparting limited oscillatory movement thereto. Such oscillatory movement of member 66 prevents jamming of closures 12 and thereby assures unimpeded advancement of the closures to the capping operation.

Other articles such as containers 51 are advanced by conveyor means such as an endless belt or chain 50 which advances the containers to a work station where container 51 and a closure 12 such as a flexible plastic closure are brought into registry and they are then advanced to a subsequent station at which the closure is secured to the container by a rotating roll 52 concentrically mounted on a driving shaft 53. Preceding the above work stations, the feeding means 40 is directed in a generally downward sloping direction as indicated at 41b. Spring members 44, 45 and 54 are provided near the end of sloping portions 41b to retain a closure in the position shown in FIG. 5. In such position, a portion of the closure projects into the path of travel of the upper edge portion of a container. As a container is fed from right to left by belt or chain 50, its upper edge portion engages and advances with it such projecting closure. After a container has thus contacted and withdrawn a closure member it continues to move to the left and is ultimately contacted by roll 52 which exerts a rolling action and causes the closure to be forced downwardly into secured engagement with the upper surface of container 51.

Before the containers 51 reach the work station at which they contact a projecting closure, the containers are spaced apart to avoid mechanical interference and to insure proper contact with the closure. This is accomplished by rotating a helical screw member 55 cooperating with an endless belt 56.

In general, and again referring to FIGS. 3, 7 and 8, according to the present invention, the diameter of orienter rolls 30 and 31 is not dependent on closure size. For example, with the embodiment illustrated in FIG. 8, the two point contact with the roll surface can be readily established and maintained while a closure is being oriented without requiring unduly large rolls with larger size closures. This embodiment also allows differing size closures 12 and 12b to be speedily and reliably oriented without requiring a change in roll size. Similarly, consideration of the geometry of a particular closure will establish a suitable minimum diameter of the orienter rolls.

A modification of manifold 20 is shown in FIG. 10. And modified manifold 20a receives closures 12 from unscrambler device 10 in a layer between spaced apart members 21a, 22a which are similar to walls 21, 22. Walls 21a, 22a extend from the right hand margin beyond the unscrambling device 10 to a location adjacent the vertical portion of passageway 25.

Closures 12 leave manifold 20a and are conveyed to the orienter 30 through a passageway which extends between passageways 25 and between a fixed guide rail 59 and an adjustably positionable guide rail 23a which is curved and extends horizontally as well as vertically. As indicated by phantom lines, member 23a can be positioned to accommodate closures of differing sizes as they move from manifold 20a to orienter 30, and member 23a also serves as a bottom for the U-shaped passageway of manifold 20a.

When the utilization of the above suggested embodiments in the practice of the present invention are employed, it has been found that closures 12 can be reliably unscrambled and oriented at speeds of the order of about 1500 closures per minute.

While particular embodiments of the invention have been shown and described herein, it will be obvious that other modifications and/or equivalents may be employed without departing from the invention, the scope of which is defined in the appended claims.

What is claimed is:

1. In a capping apparatus, the combination comprising means receiving and rotating a scrambled haphazard mass of closures and positioning said closures on edge and in a layer, means receiving and removing from said rotating means said layer of said closures, means removing and feeding from said layer a single-file succession of said closures, means receiving said single file succession and individually orienting said closures including spaced apart rotating peripheral surfaces of a pair of rolls individually rotating said closures to a desired position, means maintaining driving contact between one of said peripheral roll surfaces and two discrete spaced apart locations on the open side of an individual closure while it is being driven and rotated by said one roll surface, surface means receiving oriented closures from said peripheral surfaces, means receiving said oriented closures from said surface means and positioning said oriented closures in an oriented layer and second means removing and feeding from said oriented layer to a desired location a single file succession of said oriented closures.

2. Combination according to claim 1 wherein said two discrete locations are space-apart from the centerline of the path of individual closures during engagement by said one roll surface to effect positive control of the rotation of said closures to said desired position.

3. A method of arranging a plurality of closures comprising the steps of rotating a scrambled haphazard mass of said closures and concomitantly positioning said closures in a layer, removing said layer from said mass, subjecting said closures in said layer to opposing streams of fluid, each stream being directed to provide force components in a desired direction of feeding and in opposition to the direct of the force of gravity, separating and feeding from said layer a succession of said closures between moving peripheral surfaces, and establishing and maintaining engagement by one of said moving surfaces at two discrete spaced apart locations on said individual closures and concomitantly rotating said closures to a desired position while said engagement is maintained.

4. A method of orienting a plurality of randomly-oriented dished articles comprising the steps of:
  successively feeding said articles into a nip region between spaced-apart peripheral surfaces of a pair of counter-rotating rolls,
  subjecting opposite sides of said articles to nip pressure exerted by said rolls without substantially deforming said roll surfaces and concomitantly effecting frictional engagement between one of said undeformed surfaces with two discrete spaced-apart locations along the dished side of an individual article, and
  maintaining said frictional engagement after said individual article passes through said nip region and concomitantly causing said article to move along a predetermined path defined by said one undeformed surface while said engagement is maintained until said article is turned to a desired position in which all dished sides of all of said articles face in the same direction.

5. A method according to claim 4 wherein said two discrete locations are offset from the path defined by an individual article during its movement through said nip region thereby effecting positive control of the path followed by said article at the exit side of the nip irrespective of the size of said rolls relative to the size of said article.

6. A method according to claim 5 wherein said articles are flexible.

7. In apparatus for positioning in a desired orientation a plurality of articles initially disposed in random orientation during movement of a succession of said articles through a nip passageway between a pair of counter-rotating rolls and through one of two diverging branches of an exit passageway connected to said nip passageway, the combination comprising:
  margin means for said branches each consisting essentially of one of said peripheral surfaces defining the path of articles moving through said one branch, and
  means including spacing between said rolls subjecting said articles to nip pressure without substantial deformation of said peripheral surfaces and individually establishing and maintaining frictional driving engagement between one of said undeformed surfaces and at two discrete spaced-apart locations along the dished side of said articles during movement thereof through said nip passageway and one of said branches and concomitantly causing a particular article to move through said exit passageway and along the branch path defined by said one undeformed surface that is engaged by the dished side of said particular article.

8. Apparatus according to claim 7 wherein said branches comprise means including walls spaced apart from each of said peripheral surfaces maintaining said frictional engagement at said discrete locations and positively driving said articles through said exit passageway.

References Cited
UNITED STATES PATENTS

| | | | |
|---|---|---|---|
| 1,303,604 | 5/1919 | Sims | 302—2 |
| 3,086,639 | 4/1963 | Donofrio. | |
| 3,123,198 | 3/1964 | Hohl. | |
| 3,382,010 | 5/1968 | Wilkinson | 302—2 |

EDWARD A. SROKA, Primary Examiner